US011922909B2

(12) United States Patent
Duncan

(10) Patent No.: US 11,922,909 B2
(45) Date of Patent: Mar. 5, 2024

(54) ELECTRIC BAGPIPE AND ELECTRIC BAGPIPE COMPONENTS

(71) Applicant: David Emmanuel Alves Duncan, Los Angeles, CA (US)

(72) Inventor: David Emmanuel Alves Duncan, Los Angeles, CA (US)

( * ) Notice: Subject to any disclaimer, the term of this patent is extended or adjusted under 35 U.S.C. 154(b) by 0 days.

(21) Appl. No.: 17/854,504

(22) Filed: Jun. 30, 2022

(65) Prior Publication Data

US 2023/0005455 A1 Jan. 5, 2023

Related U.S. Application Data

(60) Provisional application No. 63/216,646, filed on Jun. 30, 2021.

(51) Int. Cl.
*G10D 7/063* (2020.01)
*G10H 3/14* (2006.01)

(52) U.S. Cl.
CPC ............ *G10D 7/063* (2013.01); *G10H 3/143* (2013.01)

(58) Field of Classification Search
CPC ...................................................... G10D 7/063
See application file for complete search history.

(56) References Cited

U.S. PATENT DOCUMENTS

| | | | | |
|---|---|---|---|---|
| 2,821,879 A | | 2/1958 | Sano | |
| 2,984,140 A | | 5/1961 | Barron | |
| 3,429,976 A | | 2/1969 | Tomcik | |
| 3,457,357 A | | 7/1969 | Jean | |
| 4,314,495 A | * | 2/1982 | Baggs | G10H 3/185 84/DIG. 24 |
| 6,075,198 A | * | 6/2000 | Grant | G10H 3/181 84/723 |
| 6,326,532 B1 | | 12/2001 | Antaki | |
| 7,534,954 B1 | | 5/2009 | Cassista | |
| 8,822,804 B1 | | 9/2014 | Vassilev | |
| 10,199,023 B2 | | 2/2019 | Pouillard et al. | |
| 2003/0075035 A1 | | 4/2003 | Ross et al. | |

(Continued)

FOREIGN PATENT DOCUMENTS

| | | |
|---|---|---|
| EP | 3726523 A1 | 10/2020 |
| ES | 1082504 | 6/2013 |
| ES | 1242233 U | 2/2020 |

(Continued)

OTHER PUBLICATIONS

Yan Cozian:"Boha electroacoustique Yan Cozian", May 11, 2014 (May 11, 2014), p. 1, XP054980688, Retrieved from the Internet: URL:https://www.youtube.com/watch?v=17cTgD xytf8 [retrieved on Jul. 14, 2020] *video time 0:05 to 2:00*.

(Continued)

*Primary Examiner* — Robert W Horn
(74) *Attorney, Agent, or Firm* — Millen, White, Zelano & Branigan, P.C.; Jennifer J. Branigan

(57) ABSTRACT

The present invention relates to an electric pickup device for a bagpipe drone stock. The present invention also relates to an electric pickup device for a bagpipe chanter stock. The invention also relates to an electric bagpipe comprising a blowstick, a bag, at least one drone stock having an electric pickup sensor within said drone stock and a chanter stock having an electric pickup device within said chanter stock.

16 Claims, 14 Drawing Sheets

(56) References Cited

U.S. PATENT DOCUMENTS

| | | | | |
|---|---|---|---|---|
| 2020/0327873 | A1* | 10/2020 | Duncan | G10H 3/16 |
| 2023/0005455 | A1* | 1/2023 | Duncan | G10H 3/16 |

FOREIGN PATENT DOCUMENTS

| | | | | |
|---|---|---|---|---|
| FR | 2698445 | B1 | 2/1995 | |
| FR | 2947373 | B1 | 8/2011 | |
| GB | 2376559 | A1 | 12/2002 | |
| GB | 2514991 | A * | 12/2014 | G10D 7/063 |

OTHER PUBLICATIONS

European search report in corresponding EP 22182032.7 dated Oct. 18, 2022 (pp. 1-9).

* cited by examiner

ELECTRIC BAGPIPE AND ELECTRIC BAGPIPE COMPONENTS

BACKGROUND

Bagpipes are a woodwind instrument which use enclosed reeds. There are numerous variations of bagpipes. A traditional bagpipe typically consists of an air reservoir (bag), a blowpipe (or bellows) for filling the bag with air, one or more drone pipes, a set of reeds, and one or more chanter pipes. The instrumentalist blows air into the bag through the blowpipe and squeezes the air out of the bag into the drone and chanter pipes, which are all attached to the bag via connecting pipes called stocks. Each drone and chanter pipe contains a reed within the stock over which air passes as it escapes the bag out through the pipes. Typically, a drone reed is a single reed, which is structurally different from a chanter reed, which is a double reed. The passage of air over the reeds causes the reeds to vibrate and produce sound, which is in turn altered by the either the length of each drone pipe or by the hole placement in the case of the chanter pipe. The chanter is the melody pipe and is typically played with two hands. Almost all bagpipes have at least one chanter and some bagpipes have two chanters. Almost all bagpipes have at least one drone and most bagpipes have multiple drones. The drone pipe is typically not fingered but rather produces a constant harmonizing note throughout play

BRIEF DESCRIPTION OF THE DRAWINGS

Various features and attendant advantages of the present invention will be more fully appreciated as the same becomes better understood when considered in conjunction with the accompanying drawings, in which like reference characters designate the same or similar parts throughout the several views, and wherein.

SUMMARY OF THE INVENTION

Figure 1:
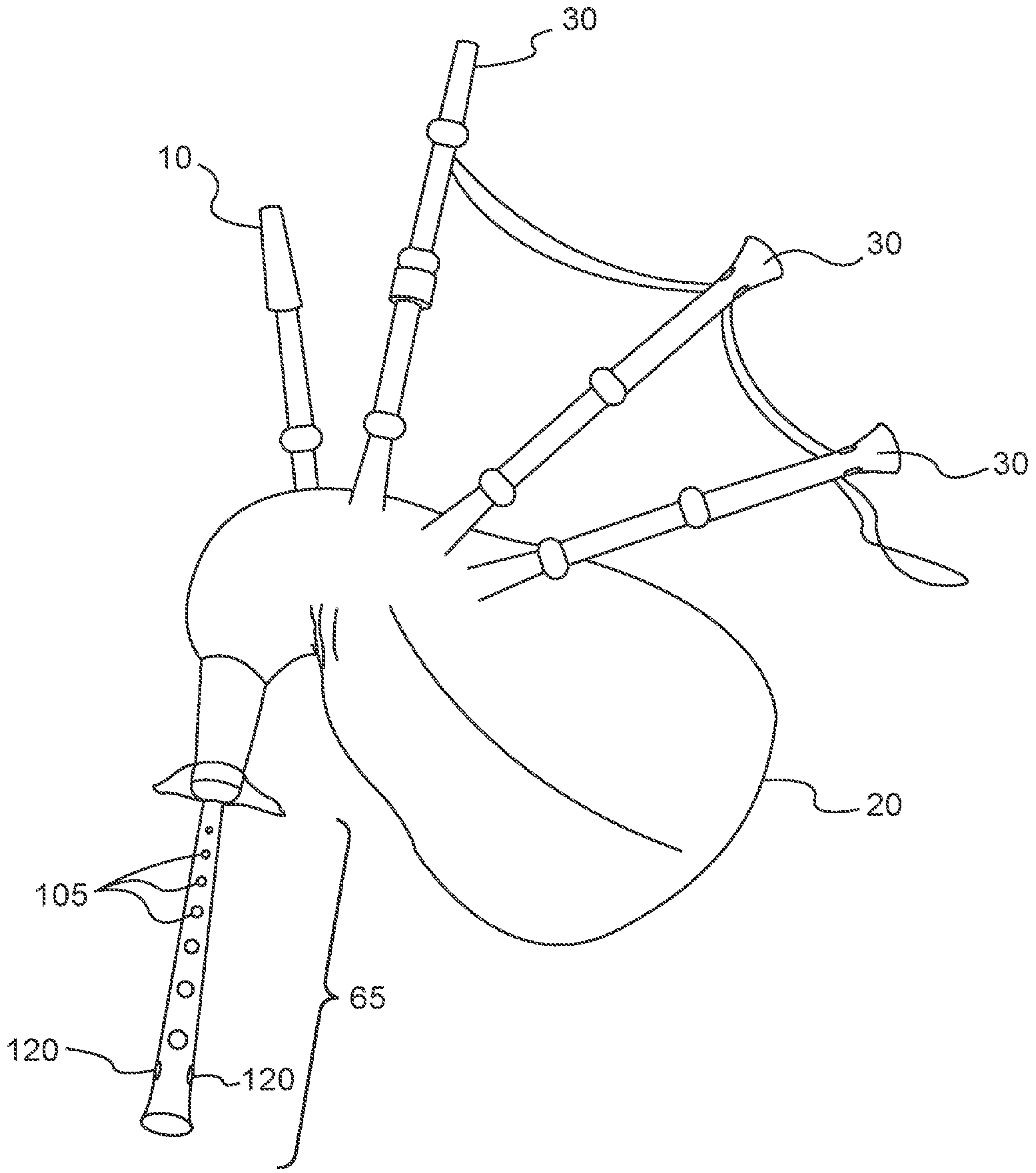
FIG. 1 depicts a typical traditional bagpipe.

The present invention is directed to an electric bagpipe comprising a blowstick (10) for delivering air to a bag (20) which receives and stores said air. The bagpipe comprises at least one drone (30) which forms sound using the air from the bag. The drone (30) includes a drone base (35) which fits into a drone stock body (40) which is open to the bag. An electric pickup device (45) having a drone sensor (50) which is spaced 0.5-5 mm from the drone reed (42). The electric pickup device (45) includes a wire (55) which transmits an audio signal, and a cable (60) connected to the wire to output the audio signal. The bagpipe also comprises a chanter (65) which forms sounds using the air from the bag. The chanter includes a chanter body (70) and a reed seat (75) holding a chanter reed (80); and an electric pickup device (85) within the chanter (65). The electric pickup device includes a chanter sensor (92) spaced 0.5-5 mm from the chanter reed (80), a wire (95) enclosed within a cable (100) which leads to a mono plug. The wire transmits an audio signal. Preferably, the drone sensor (50) and chanter sensor (92) are piezoelectric.

Preferably, the bagpipe comprises at least two drones. Most preferably, the bagpipe comprises at least three drones.

In a preferred embodiment the chanter sensor (92) is spaced 1-4 mm from the chanter reed (80) and the drone sensor (50) is spaced 1-4 mm from the drone reed (42).

The present invention also includes an electric pickup device for a bagpipe drone comprising an electric pickup device (45) having a drone sensor (50) spaced 0.5-5 mm from a drone reed tongue (41). The electric pickup device (45) includes a wire (55) to transmit the audio signal from the drone sensor (50) based on the vibrations in the drone reed (41). The wire is encased in a cable (60) which leads to a mono plug to output the audio signal. Preferably, the drone sensor (50) is spaced 1-4 mm apart from the drone reed tongue (41). Most preferably, the drone sensor (50) is spaced 1.5-2 mm apart from the drone reed tongue (41). In a preferred embodiment, the wire (55) is embedded into a reed seat (43).

The present invention also includes an electric pickup device for a bagpipe chanter (65) comprising a chanter reed (80) secured in a reed seat (75) and a chanter sensor (92) fixed to the reed seat (75) which detects vibrations on the chanter reed (80). The chanter sensor (92) is spaced 0.5-5 mm from the chanter reed (80). A wire (95) encased in a cable (100) transmits an audio signal from the chanter sensor (92) based on the vibrations in the chanter reed (80). The wire/cable leads to a mono plug which outputs the audio signal. Preferably, the chanter sensor (92) is spaced 1-4 mm from the chanter reed (80) and the wire (95) is embedded into a reed seat (75). Most preferably, the chanter sensor (92) is spaced 1.5-3 mm from the chanter reed (80).

In a particularly preferred embodiment of the present invention, the sensor is placed, embedded or adhered within an indented groove in the stock wall. Thus, the present invention also includes an electric bagpipe drone stock (210) comprising a sensor (270) adhered or embedded within an indented groove (230) in a stock inner wall (220). The indented groove (230) has a hole extending between the inner wall (220) of the drone stock and an outer wall of the stock. A wire (260) extends from the sensor to a jack house (275) mounted on the outer wall of the stock. Preferably, the indented groove is between 3-4 mm deep and between 11-14 mm wide. In a preferred embodiment, the drone stock sensor (270) is located about midway between the drone bag opening (240) and the insertion end of the drone stock. Preferably, the drone stock sensor is between 0.4 and 0.6 mm thick. Most preferably, the drone stock sensor is between 0.5 and 0.7 mm thick.

The present invention also includes an electric bagpipe chanter stock (125) comprising a sensor (175) adhered or embedded within an indented groove (195) in a stock inner wall (130). The indented groove (130) has a hole extending between said inner wall (130) of said chanter stock and an outer wall of said stock. A wire (180) extends from said chanter sensor (175) to a jack house (190) mounted on the outer wall of said stock. Preferably, the indented groove is located on the chanter insertion end (140) of said chanter stock. Preferably, the indented groove (195) is between 3-4 mm deep and between 11-14 mm wide. Preferably, the chanter sensor is between and 0.6 mm thick. Most preferably, the chanter sensor is between 0.5 and 0.7 mm thick.

In another preferred embodiment, the pickup device includes an integrated buffer circuit (310) added to the jack housing (190, 275). The integrated buffer circuit (310) is located in the chanter/drone stock in between the piezo pickup (175, 270) that is attached to the inner wall of the stock and the output jack.

DETAILED DESCRIPTION OF THE INVENTION

FIG. 1 depicts a traditional bagpipe consisting of an air reservoir or bag (20), a blowstick (10) (or bellows) for filling the bag with air, one or more drone pipes (30), each with an associated drone reed (42), and a chanter pipe (65) with an associated chanter reed (80). The chanter has sound holes (120) which are not typically covered with the fingers while playing the chanter. The instrumentalist blows air into the bag through the blowpipe and squeezes the air out of the bag into the drone and chanter pipes, which are all attached to the bag via connecting pipes called stocks. Each drone and chanter pipe contains a reed within the stock over which air passes as it escapes the bag out through the pipes. The passage of air over the reeds causes the reeds to vibrate and produce sound, which is in turn altered by the either the length of each drone pipe or by the hole placement in the case of the chanter pipe.

The chanter is the melody portion of a bagpipe. The chanter consists of holes (105) which the instrumentalist covers with their fingers to create notes by changing the pitch at which the reed (80) vibrates, thus producing different tones or notes.

Figure 2:
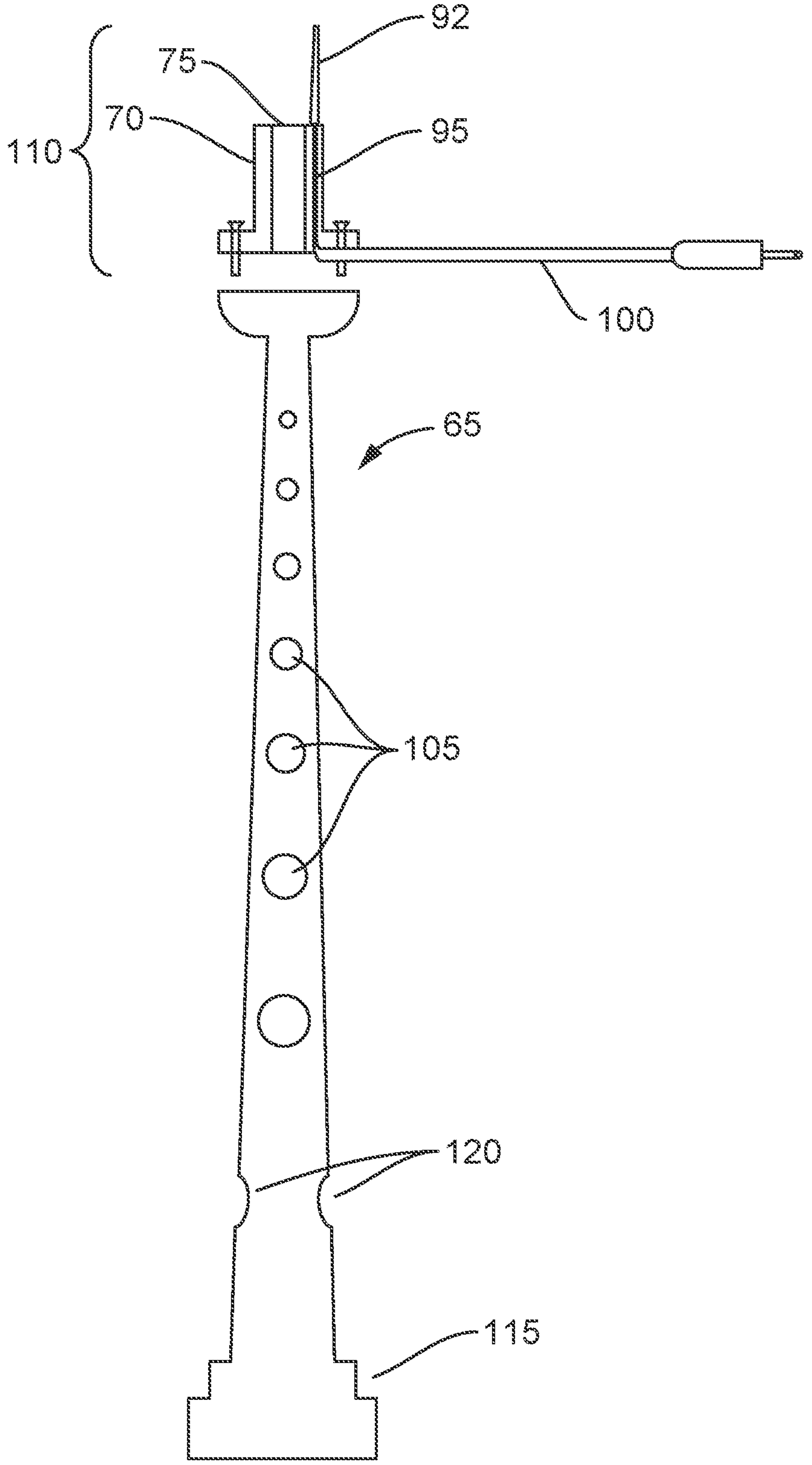
FIG. 2 depicts a chanter embodiment of the present invention.
Figure 5:
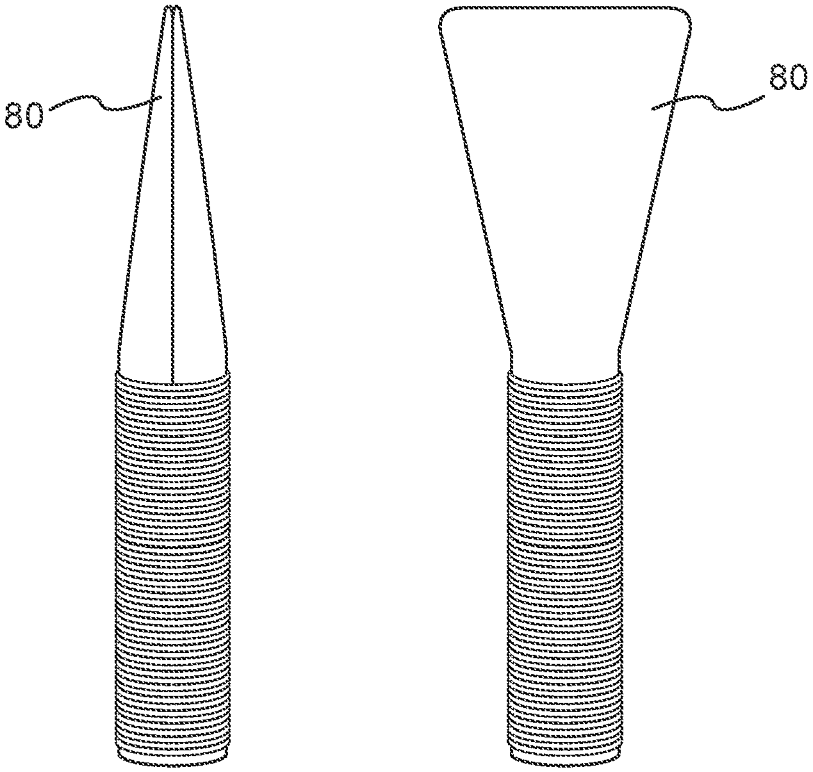
FIG. 5 depicts a traditional double chanter reed (80)

Placement of the chanter sensor depends on the desired sound effect and on the selection of the reed. FIG. 2 depicts a chanter embodiment of the present invention in which the chanter sensor has a slightly bent tip. In this embodiment the majority of the sensor is spaced from 0.5-5 mm away from the reed and the bent tip is spaced closer the reed. In a preferred embodiment, the bent tip does not touch the reed but it is bent so that the tip is closer to the reed than the rest of the sensor. In certain embodiments, the chanter sensor is parallel to the length of the chanter reed. In certain embodiments, the bent tip actually makes slight contact with the reed. As shown in FIG. 5, a chanter reed (80) is typically a double reed consisting of two pieces of cane which vibrate against each other to create sound when air is blown over the reed. Chanter reeds may also be made from synthetic materials. The reed is placed into a reed seat (75) located in the top portion of a chanter (65), as shown in FIG. 2.

The pitch does not originate from the air coming through the holes (105) on the chanter. The source of pitch variation is coming from the reed itself. The distance between the reed and the hole (105) locations on the chanter as air passes through the reed changes the frequency at which the reed vibrates, thus producing different notes.

Chanter notes are higher pitched than the drone notes, thus, a piezo transducer with a higher resonant frequency is better matched. Most piezoelectric pickups range between 1 and 6 KHz. In a preferred embodiment, the chanter piezoelectric pickups ranges between 3 and 5.5 KHz. In a particularly preferred embodiment a piezoelectric chanter pickup with a frequency 4.6 kHz (+/−.5 kHz) was found to produce excellent sound. By placing a chanter sensor (92) in slight contact with the reed itself or, in a preferred embodiment, within 0.5-5 mm apart from the reed, the vibrations of the chanter reed (80) are converted into an electrical audio signal. This electrical audio signal can then be amplified and altered according to the instrumentalist's preference. Because the double reed needs to be able to vibrate freely in order to produce sound, the placement of the chanter sensor (92) is important. The chanter sensor (92), being a contact microphone, must come into contact with the source of vibration (e.g., the cane of the reed) or be spaced very close to the vibration source. In certain embodiments of the present invention, the bent tip of the chanter sensor (92) is designed to make as little contact with the reed as possible so as not to interfere with reed vibrations.

The chanter sensor (92) used to create the electric audio signal is typically a thin disc consisting of a ceramic material adhered to a soft metal such as brass. Preferably, the chanter sensor is between 0.3 and 0.6 mm thick. Most preferably, the chanter sensor is between 0.42 and mm thick. Other well-known sensor materials may also be used. By bending the tip of the metal portion of the disc, the piezoelectric transducer can be positioned near the reed without obstructing the reed's ability to vibrate freely as long as only the bent tip of the sensor touches the reed. In certain embodiments, the bent tip of the sensor is slightly spaced apart from the reed. See, for example, FIG. 6*a*.

FIG. 5 depicts a traditional double chanter reed (80). As shown, the chanter reed is larger at the base and narrows towards the top portion. Thus, in certain embodiments, the entire chanter sensor (92) is bent such that the length of the sensor follows the length of the reed with an even spacing between the sensor and the reed along the length of the reed.

In certain embodiments, the sensor is attached to the base and is straight. See for example, FIG. 7*a*. In such embodiments the gap between the sensor and the reed will vary along the length of the reed from e.g., between 0.5 to 5 mm. The gap will be smaller at the base and larger towards the top of the reed.

Bagpipe drone reeds have typically been produced from a hollow piece of cane tubing which is sealed at one end and open at the opposing end. A "tongue" or elongated three-sided flap of cane is cut into the cane. The length of the tongue is altered by means of a bridle which girdles the body of the reed and can be moved upward or downward to change pitch. While a drone reed is most commonly a cylindrically-bored tube with a single reed, drones with double reeds exist. GB190814366A, US2003075035A, US2014331849A, U.S. Pat. No. 5,959,226A and GB2376559A depict and describe variations on drone reeds.

Figure 3:
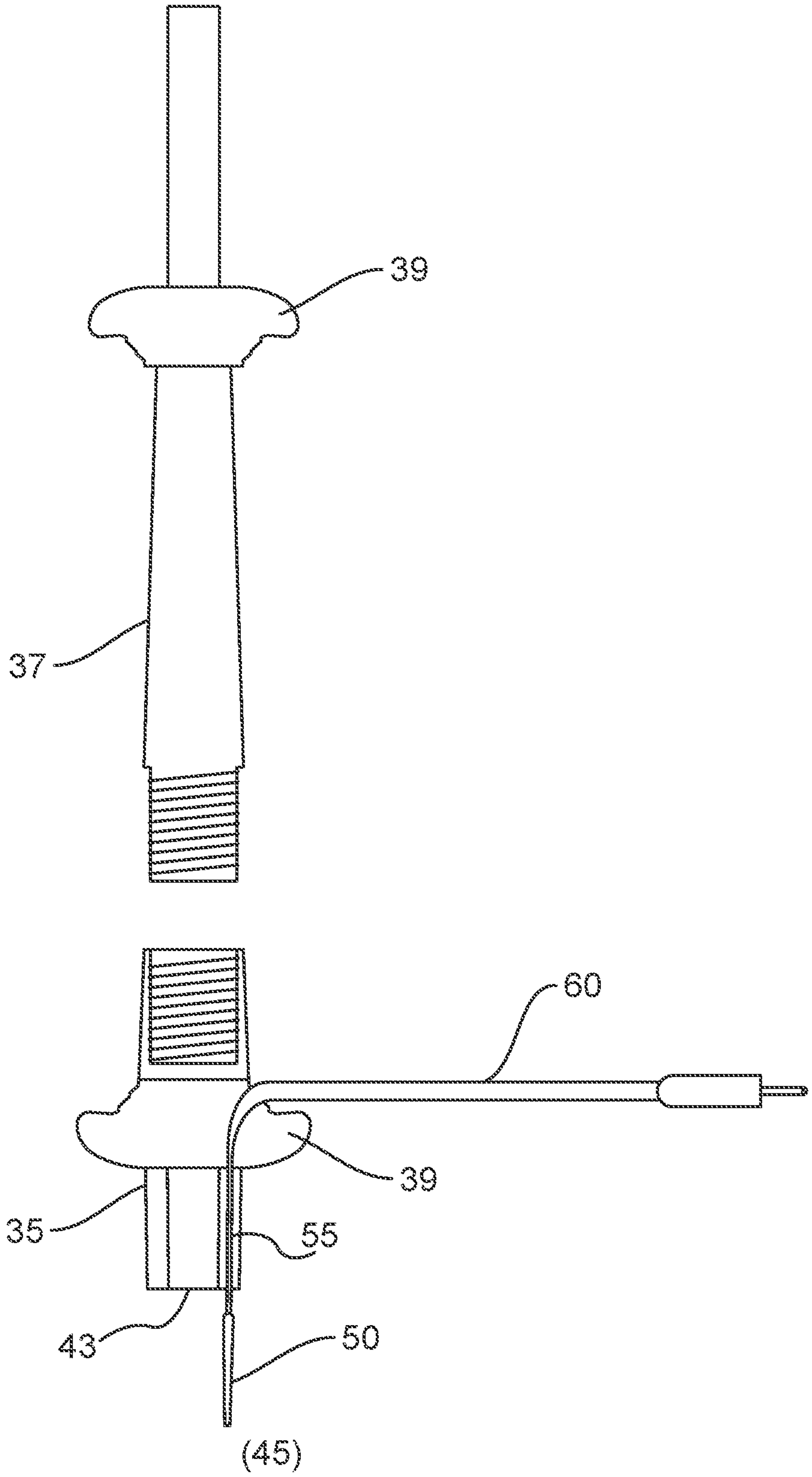
FIG. 3 depicts a drone embodiment of the present invention.

FIG. 3 depicts a preferred drone embodiment of the present invention. As seen, a drone base top (37) is adapted to be removably engaged (by threads) from the drone base (35). However, in certain embodiments the joints between removable portions may have traditional hemp twine seals. In the case of the drone the wire (55) which leads from the drone sensor (50) leads thru a hole in the drone base (35) and a projecting mount (39) to a cable (60). However, in certain embodiments the wire and cable are mounted to the outside surface of the drone base (35).

Figure 4:
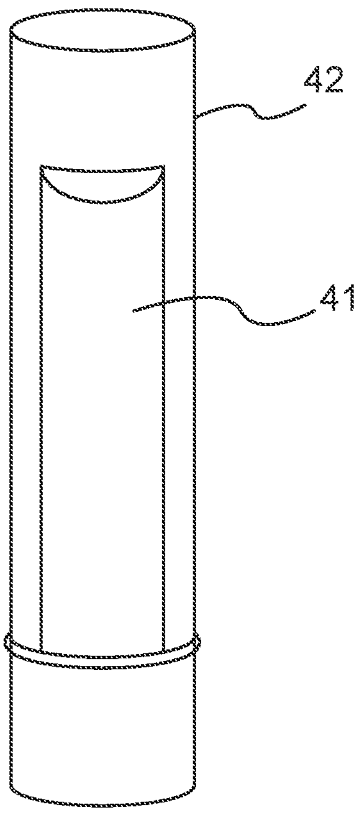
FIG. 4 depicts a traditional drone reed (42) with a tongue (41).

FIG. 4 depicts a traditional drone reed (42). The passage of air over the drone reed (42) causes the drone reed tongue (41) to vibrate and produce sound. Modern drone reeds are often made of synthetic materials which tend to be thicker than natural cane reeds. The optimal gap between the reed and the sensor will depend on the type of reed, the type of sensor and the desired sound. For example, in a typical cane reed an optimal space between the reed and the drone sensor is typically 2-3 mm. In a typical synthetic reed the space between the reed and the drone sensor is smaller and for some reeds it is preferable that the drone sensor is actually slightly touching the reed.

Drone notes are lower pitched, thus a drone sensor with a lower resonant frequency often sounds best. Piezoelectric pickups often range between 1 and 6 KHz. In a preferred embodiment the drone pickup is between 1 and 3 kHz (+/−.3 kHz). In a most preferred embodiment, a piezo pickup with a frequency 2.2 kHz (+/−.3 kHz) produced excellent sound. In general a drone sensor which is piezo electric and between 0.4-0.6 thick produces the best sound. Preferably, the piezo electric sensor is between 0.5-0.7 mm thick. Most preferably, the piezo electric sensor is between 0.55-0.65 mm thick.

Placement of the drone sensor depends on the desired sound effect and on the selection of the reed. Some drone reeds are made of synthetic body with a synthetic tongue (e.g., carbon fiber or polycarbonate). Reeds are also typically made of wood (e.g. redwood) or cane. Thus, if a synthetic tongue is used the sensor may be placed closer to the reed.

Figure 6A:
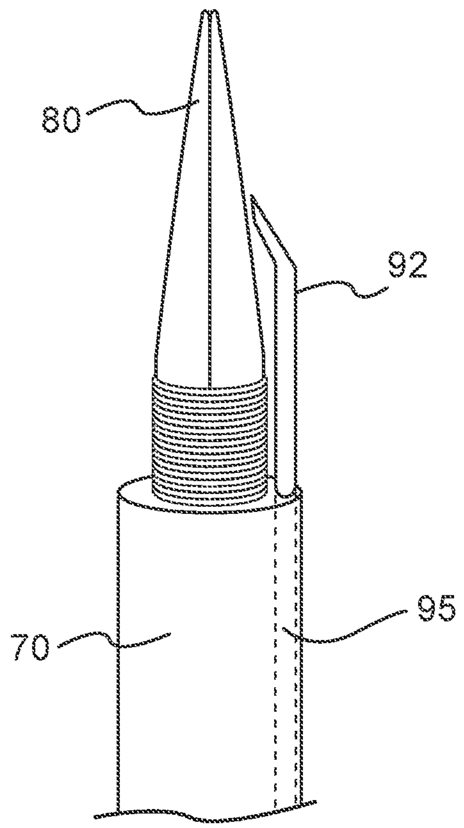
FIG. 6*a* shows an embodiment of the present invention where the chanter sensor (92) tip is bent towards the chanter reed (80).
Figure 7A:
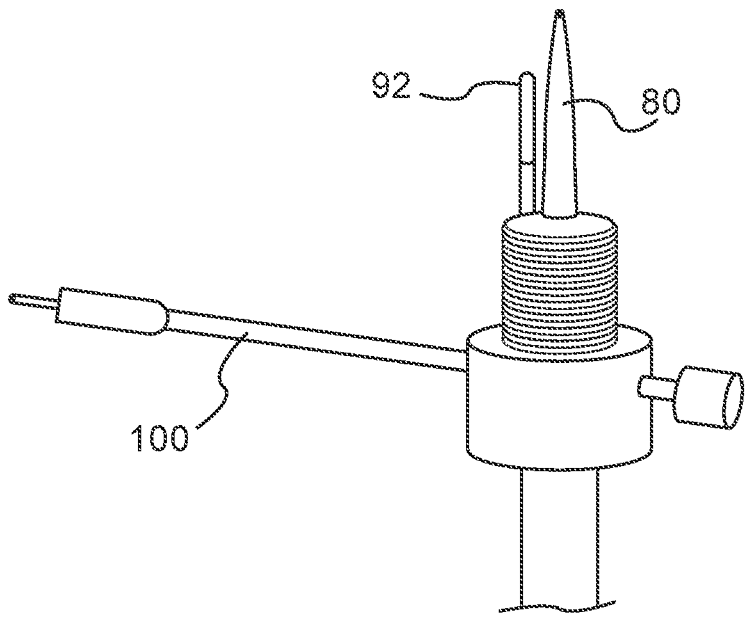
FIG. 7*a* shows embodiment of the present invention where the chanter sensor (92) is spaced apart from the chanter reed (80).

FIG. 6*a* shows an embodiment of the present invention where the chanter sensor (92) is slightly bent at the tip so that the tip is closer to the reed. In some embodiments the tip actually makes slight contact with the chanter reed. In other embodiments, the bent tip is placed just shy of touching the reed. FIG. 7*a* shows embodiment of the present invention where the chanter sensor (92) is spaced apart from the chanter reed (80). In another preferred embodiment, the chanter sensor is spaced 0.5-5 mm away for the reed. Preferably, the chanter sensor is spaced 1-4 mm away from the chanter reed. Preferably the chanter sensor is made of a Brass/Ceramic material. Although, other sensor materials may also be used such as, for example, single-crystal materials (such as quartz, gallium-phosphate, tourmaline, etc). Ceramic materials are more sensitive but less stable over time whereas single crystal based sensors are less sensitive but more stable over time.

Figure 6B:
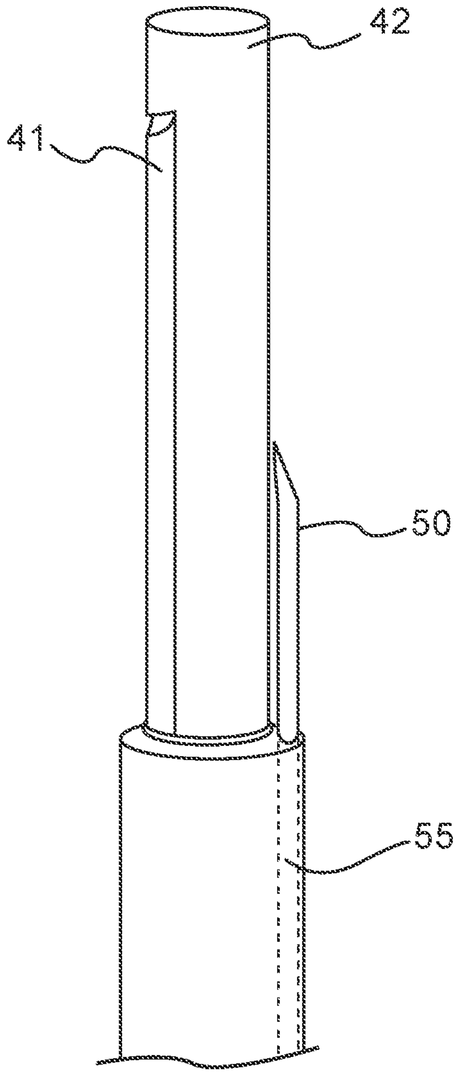
FIG. 6*b* shows embodiment of the present invention where the drone sensor (50) is slightly spaced from the drone reed (42).

FIG. 6*b* shows embodiment of the present invention where the drone sensor (50) is slightly spaced from the drone reed (42). Depending on the desired sound, the sensor can be placed on the side of the reed opposing the tongue or on the tongue side of the reed. Preferably the drone sensor is made of a Brass/Ceramic material. Although, other sensor materials may also be used such as, for example, piezoelectric ceramics (such as PZT ceramic), single-crystal materials (such as quartz, gallium-phosphate, tourmaline, etc). Ceramic materials are more sensitive but less stable over time whereas single crystal based sensors are less sensitive but more stable over time.

Figure 7B:
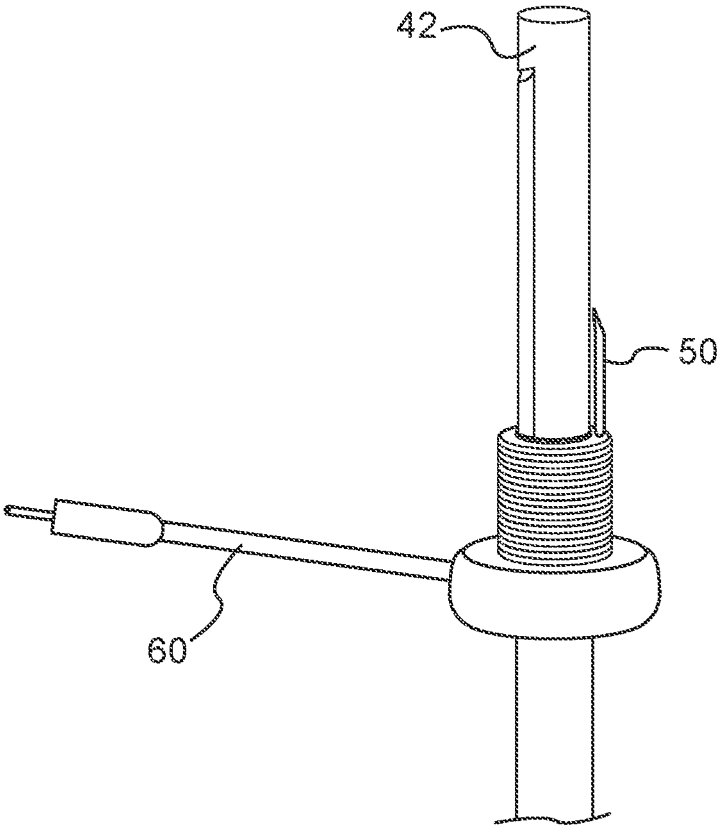
FIG. 7*b* shows embodiment of the present invention where the drone sensor (50) is spaced apart from a drone reed (42).

Preferably, the drone sensor is between 0.4 and 0.6 mm thick. Most preferably, the drone sensor is between 0.5 and 0.7 mm thick. FIG. 7*b* shows embodiment of the present invention where the drone sensor (50) is spaced apart from a drone reed (42). In a preferred embodiment, the drone sensor (50) is spaced 0.5-5 mm away for the drone reed. Preferably, the drone sensor (50) is spaced 1-4 mm away from the drone reed. In some embodiments the drone sensor is bent so that the tip of the sensor is closer to the reed than the base of the sensor.

Stock Sensors

In a particularly preferred embodiment of the present invention, a sensor is placed, embedded or adhered within an indented groove in the stock inner wall.

Thus, the present invention also includes an electric bagpipe drone stock (210) comprising a sensor (270) inserted, adhered or embedded within an indented groove (230) in a stock inner wall (220). The indented groove (230) has a hole extending between the inner wall (220) of the drone stock and an outer wall of the stock. A wire (260) extends from the sensor to a jack house (275) mounted on the outer wall of the stock. Preferably, the indented groove is between 3-4 mm deep and between 11-14 mm wide. However, depending on the material that the stock is made from the sensor groove may be deeper. In a preferred embodiment, the drone stock sensor (270) is located about midway between the drone bag opening (240) and the insertion end of the drone stock. Preferably, the drone stock sensor is between 0.4 and 0.6 mm thick. Most preferably, the drone stock sensor is between 0.5 and 0.7 mm thick.

The present invention also includes an electric bagpipe chanter stock (125) comprising a sensor (175) adhered or embedded within an indented groove (195) in a chanter stock inner wall (130). The indented groove (130) has a hole (180) extending between said inner wall (130) of said chanter stock and an outer wall of said stock. A wire (165) extends from said chanter sensor (175) to a jack house (190) mounted on the outer wall of said stock. Preferably, the indented groove is located on the chanter insertion end (140) of said chanter stock. Preferably, the indented groove (195) is between 3-4 mm deep and between 11-14 mm wide. However, depending on the material that the stock is made from the sensor groove may be deeper.

Figure 8:
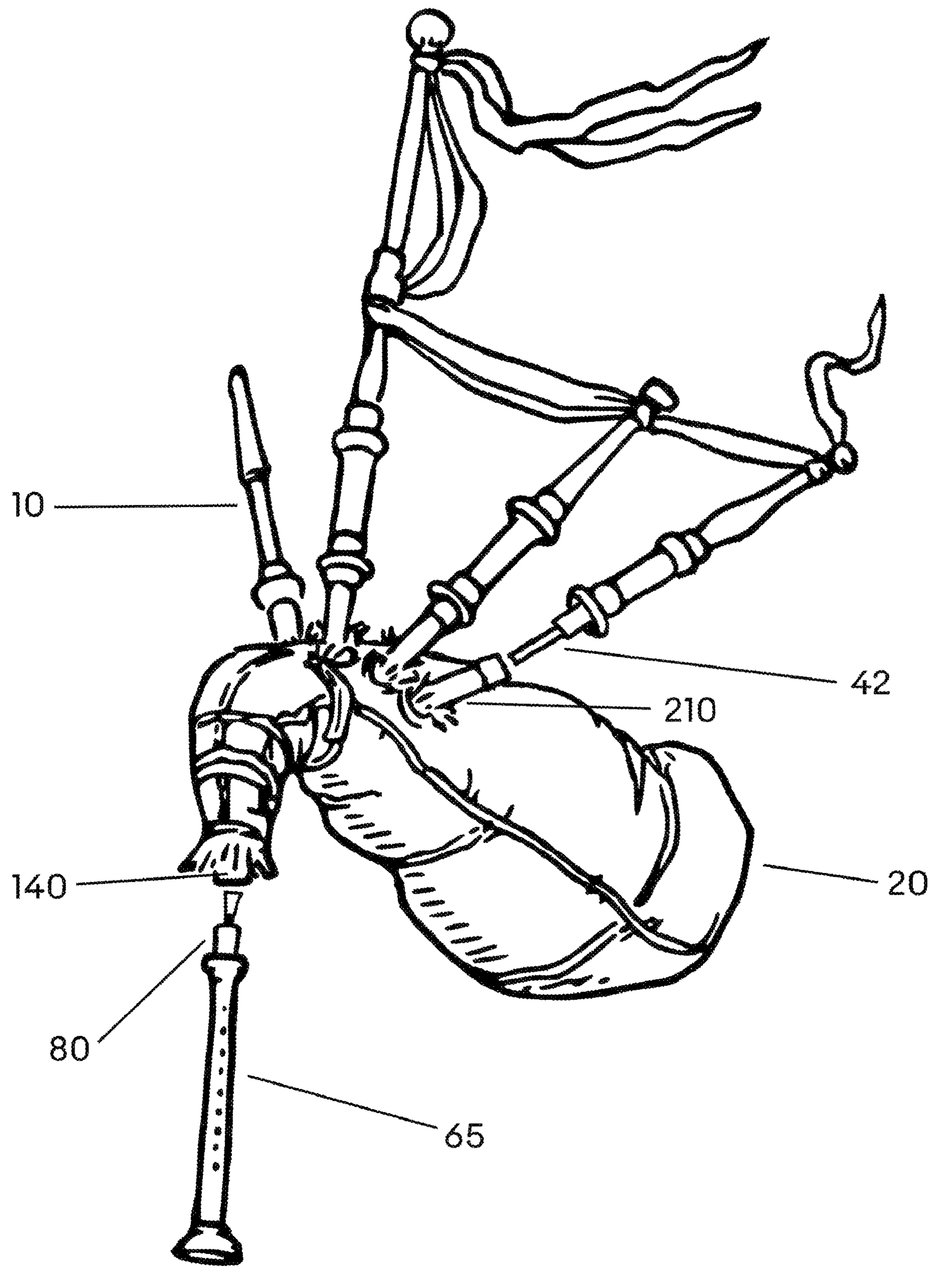
FIG. 8 depicts a typical traditional bagpipe depicting a chanter with reed spaced apart from the bag and a drone with reed spaced apart from the bag.
Figure 9:
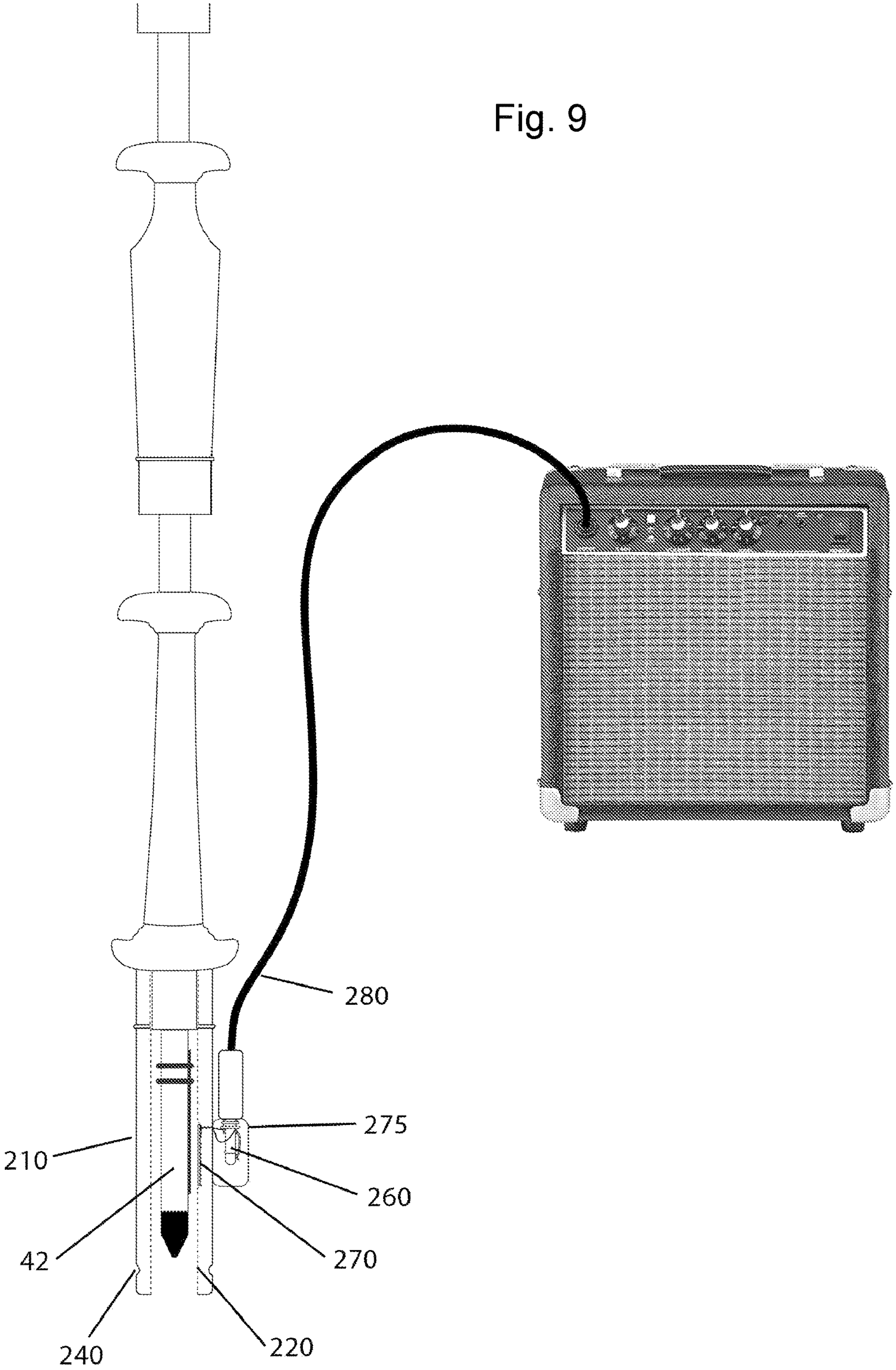
FIG. 9 depicts a drone stock embodiment of the present invention where the sensor is placed within a sensor groove indented in the stock wall.

Preferably, the chanter sensor is between 0.4 and 0.6 mm thick. Most preferably, the chanter sensor is between 0.5 and 0.7 mm thick FIG. 8 depicts a typical traditional bagpipe depicting a chanter pipe with reed (42) that is removed from and spaced apart from the bag. The figure also depicts a drone pipe with reed (80) removed from and spaced apart from the bag. Thus, in a typical bagpipe the drone pipes and chanter pipe are removable from the bag. This allows the reeds (e.g., 80, 42) to be replaced or different chanter pipes or drone pipes to be used depending on the desired sound the musician is interested in achieving. The chanter pipe or drone pipes couple to the bag via bagpipe stocks. The term "bagpipe stock" referred to herein refers a stock which is capable of being mounted to an outlet of an inflatable bag of a set of bagpipes, and which is capable of having any pipe of the bagpipe coupled therewith, including tenor and base drone pipes, chanter and blowpipe. Typically, the bag attaches to the bagpipe stocks at a bag attachment grooves (200, 170) on the bag attachment end of the stock. The stocks are adapted to couple to the corresponding pipes at the insertion end of the stocks (e.g., 140, 300).

Figure 10A:
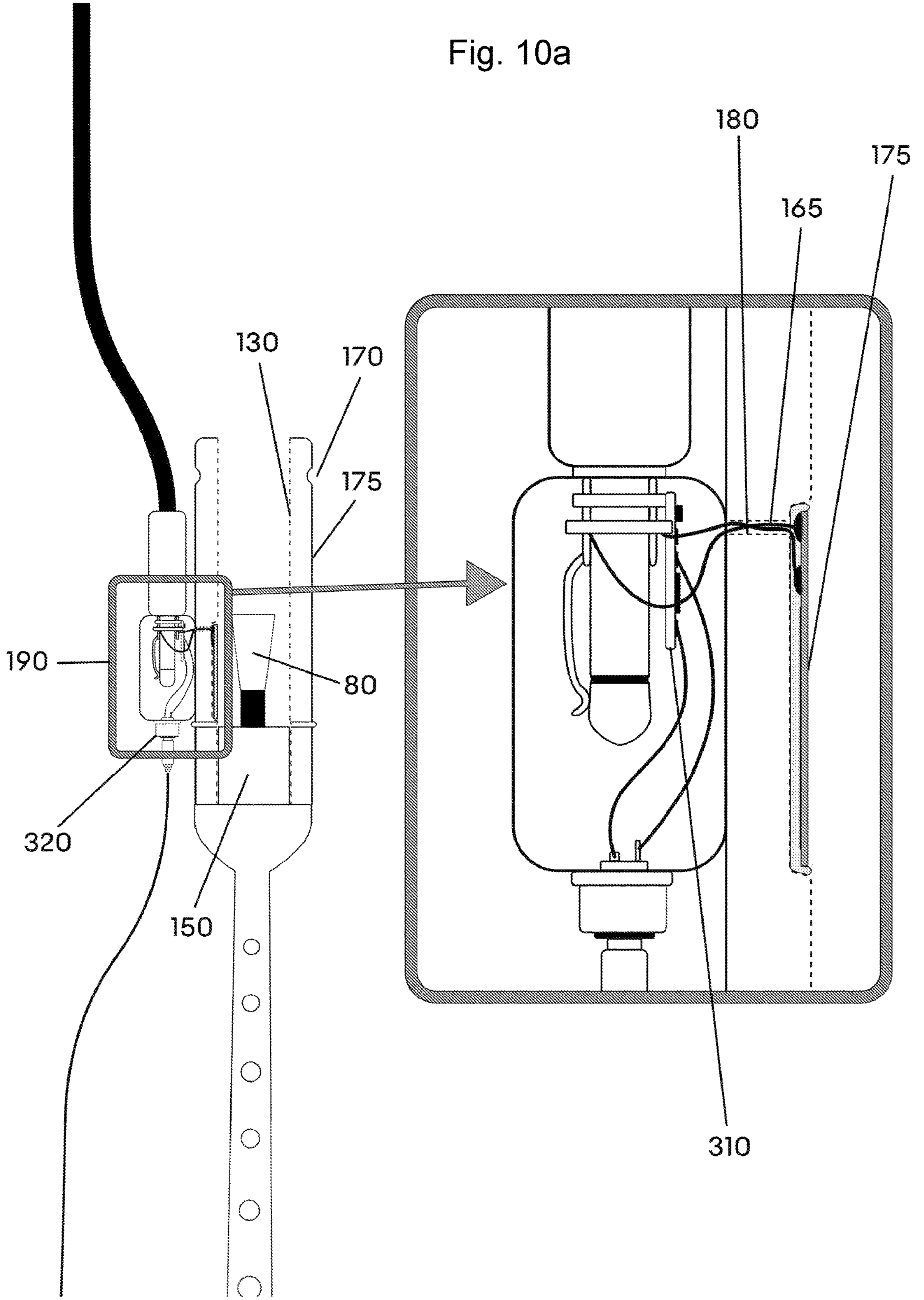
FIG. 10*a* depicts a close up view of a canter sensor groove (195) in a canter stock embodiment of the present invention.
Figure 10B:
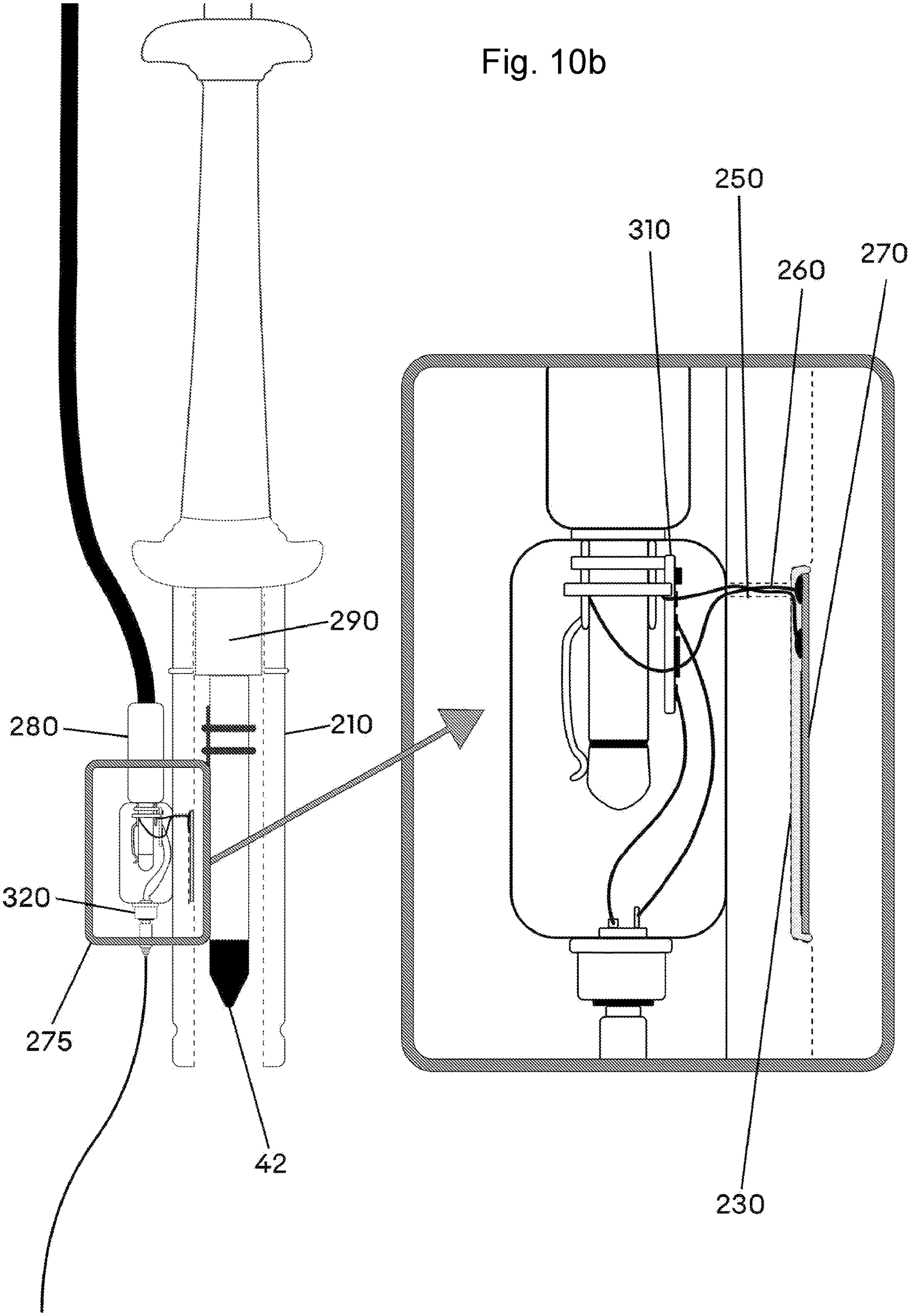
FIG. 10*b* depicts a close up view of a drone sensor groove (230) in a drone stock embodiment of the present invention.

FIG. 10*a* depicts a close up view of a canter sensor groove (195) in a canter stock embodiment of the present invention. As can be seen, two wires extend from the canter sensor (175) through a hole (180) in the stock wall and lead to a jack house unit (190) mounted on the outer wall of the stock. FIG. 10*b* depicts a close up view of a drone sensor groove (230) in a drone stock embodiment of the present invention. Two wires extend from the drone sensor (270) through a hole (250) in the stock wall and lead to a jack house unit (190) mounted on the outer wall of the stock.

Figure 11:
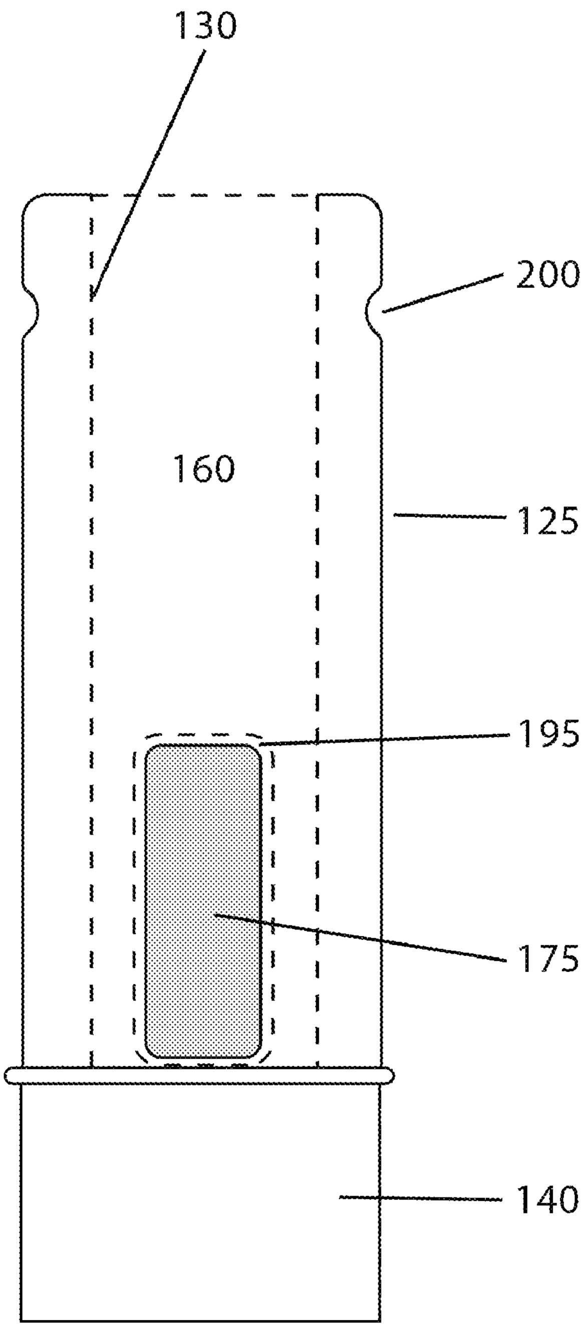
FIG. 11 depicts a cut away view of a canter stock embodiment of the present invention.
Figure 12:
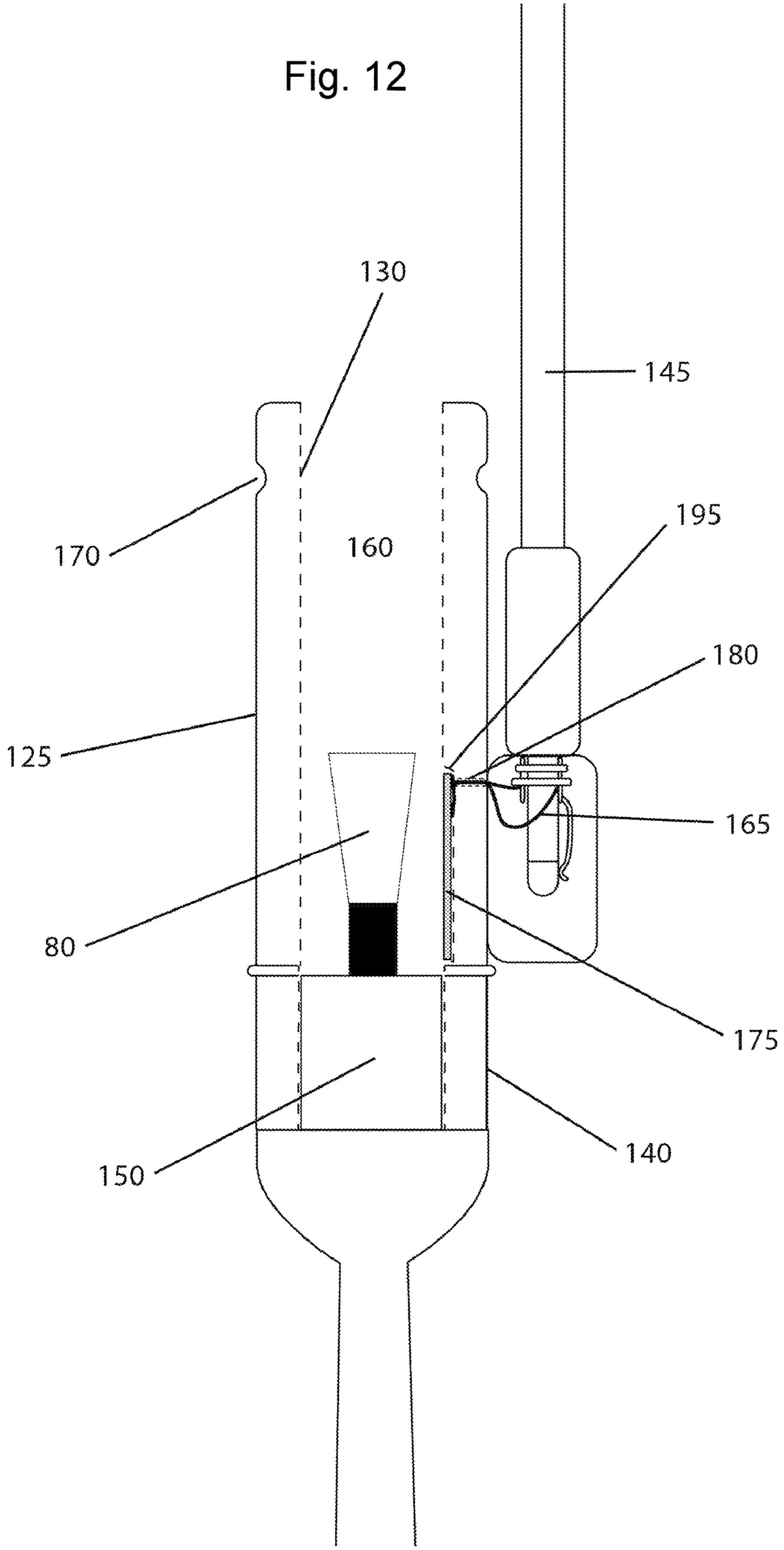
FIG. 12 depicts a cut away view of a canter stock embodiment of the present invention. The sensor is spaced in proximity to the canter reed.

The optimal location of a sensor is based on where the reed is located when the Chanter or drone is inserted into the stock. In the chanter, it is preferable that the reed sits closer to the opening of the stock. In the drone, it is preferable that the reed is located about midway between the base and middle of the stock. Preferably, the sensor is positioned as close to the sound source (reed) as possible. However, placement of the sensors in other areas of the drone may be higher or lower depending on the sound and tones desired. FIG. 11 depicts a cut away view of a canter stock embodiment of the present invention showing the sensor placement towards the chanter insertion end of the stock (140). FIG. 12 depicts a cut away view of a canter stock embodiment of the present invention, which is engaged with the chanter mount and reed. The sensor is spaced in proximity to the canter reed. The reed (80) is attached to the mount (150) which is coupled to the chanter insertion end (140) of the chanter stock.

Figure 13:
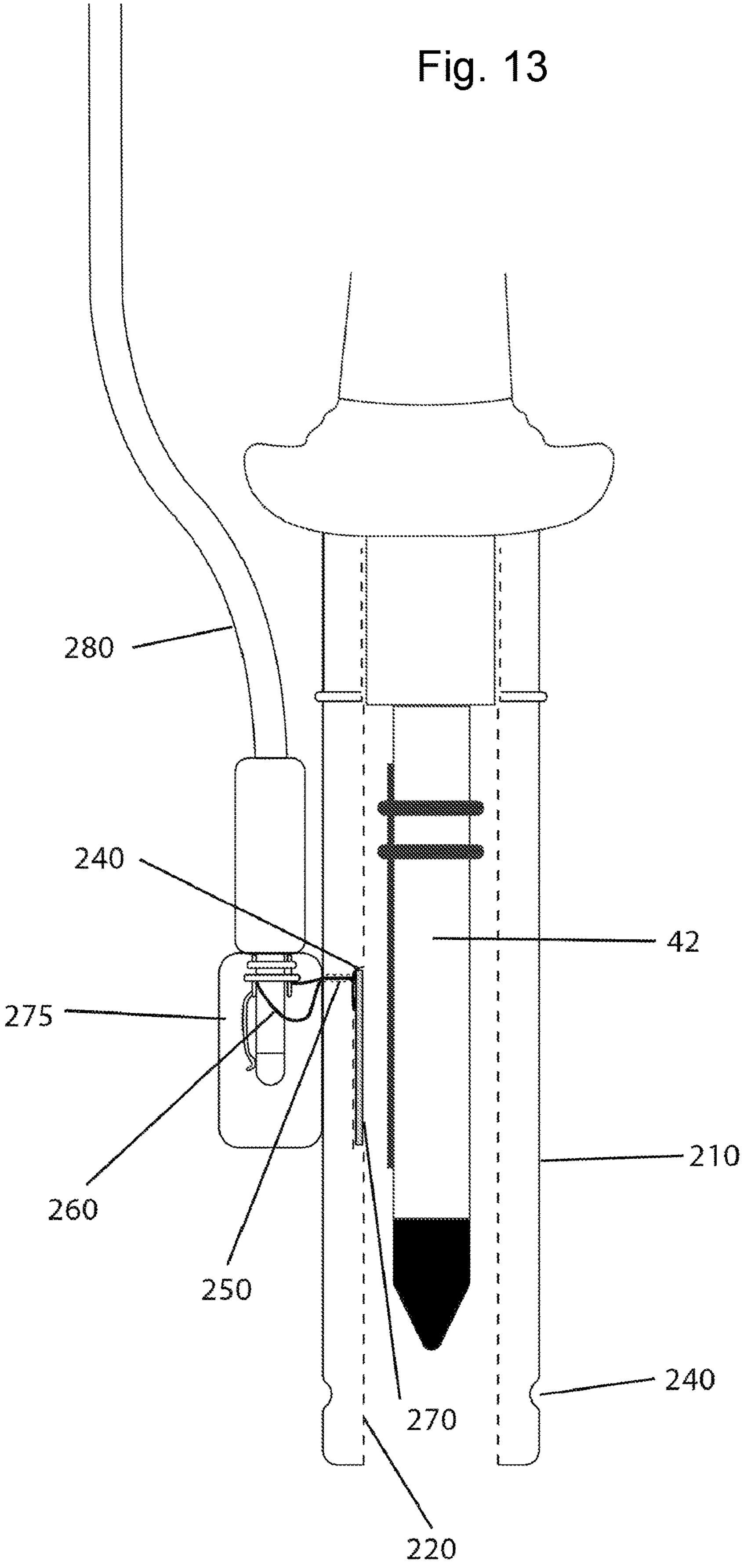
FIG. 13 depicts a cut away view of a drone stock embodiment of the present invention. The sensor is spaced in proximity to the drone reed.

FIG. 13 depicts a cut away view of a drone stock embodiment of the present invention. The sensor is spaced in proximity to the drone reed. In this embodiment, the drone sensor (270) is positioned in about the center of the drone reed (42). The reed drone (42) is attached to the drone mount (290) which is coupled to the drone insertion end (300) of the drone stock.

Raw materials used in the manufacture of bagpipes are often determined based on the humidity of the region where the bagpipe is to be played. Some tropical hardwoods used to make the chanter and drones, particularly ebony, are ideal for damp climates but do not work well in the drier regions. Plastics, particularly acetyl homopolymers, are often used to avoid the complications of moisture and temperature fluctuations. An ideal material for a Chanter Stock is a hard wood such as African Black Wood (traditionally used in Highland Bagpipes) but other types of wood can be used. The wood absorbs some of the moisture from the breath that can collect on the cane chanter reed. Thus, when cane reeds are used, having a wooden stock is preferred. In the case of synthetic reeds, as is more common in the bagpipe drone reeds, a stock made of hard plastic such as Delrin or Polypenco is preferable. If a cane drone reed is being used in the drone, (less common) then wooden stocks might be preferable.

The groove for the sensor can be machined into the inner wall of the stock after the bore has been drilled out. Moldable plastics are not often used in Bagpipe parts because the softer plastic materials tend to change shape depending on external temperature and humidity. However, in plastic stocks the groove may be molded into the inner wall of the stock. The sensor groove may also be machined into the inner wall of plastic stocks.

The sensor may be conventionally adhered to the sensor groove in the stock wall by an adhesive such as, for example, a commercially available two-part epoxy adhesive consisting of a base and an accelerator.

In certain embodiments the stock may be attached via a hook and loop type adhesive. This allows the sensor to be repositioned or replaced. The sensor may also be placed in the groove with only a pressure fit, as the wire will hold the sensor in place.

There numerous conventional ways that chanter or drone pipes may be attached to their corresponding stocks. For example, the stock may attach to the reed mount (e.g., 150, 290) via a cork pressure fit. In a preferred embodiment they may be attached via threaded couplings such as can be seen in GB2514991A. Traditionally, chanter or drone pipes are attached to their corresponding stocks and held in place when the outward pressure of a material in the gap creates friction between the parts. The most commonly used material for this application is either hemp or linen string which is often coated with wax.

In certain embodiments, the piezoelectric sensor is soldered to two 26 gauge wires (165) (260). The wires lead from the sensor thru a hole in the stock to the respective jack housing. To protect the wires, which exit the drone or chanter, the wires are covered with cable material such as, for example, heat-shrink plastic wrap. In preferred embodiments, the ends of the wires are soldered to a ⅛" (3.5 mm) mono 'male' plug. To connect the sensor to an external amplification device, a cable adapter may be necessary. The preferred cable adapter is a mono 'female' ⅛" to a mono 'female' ¼" adapter. The adapter is secured to the drone or chanter stock using, for example, a metal hose clamp or bound to the stock with twine. A ¼" instrument cable of varying length can be connected to the adapter and fed into an amplification device. Alternatively, if connecting into a computer or other smaller device a cable with a ⅛" mono 'female' jack leading to a ⅛" mono 'male' plug may be used. This type of cable can be directly fitted to the plug coming out of the bagpipe and no adapter is necessary. An adapter may be necessary for ¼" connections, which are more typical in guitar and live instrument amplification.

FIGS. 10*a* and 10*b* depict another preferred embodiment of the present invention where the pickup device includes an integrated buffer circuit (310) added to the jack housing (190, 275). The integrated buffer circuit (310) is located in the chanter/drone stock in between the piezo pickup (175, 270) that is attached to the inner wall of the stock and the output jack. Preferably, the integrated buffer circuit is housed inside the same enclosure that constitutes the jack housing (190, 275). Rather than being wired directly to the jack, the piezo pickup may be wired directly into the integrated buffer circuit which in turn is wired to the output jack. The signal is connected to an amplifier by means of an audio cable connecting the output jack and the amplifier. In certain embodiments the integrated buffer circuit requires external power (320). The integrated buffer circuit may be powered via either a 9 Volt battery or a DC Power Adapter attached to a DC Power Jack wired into the buffer circuit. The purpose of the buffer circuit is to correct an impedance mismatch which naturally occurs between the piezo pickup and most modern amplifiers and/or effects units. Generally, piezo pickups do work as effectively without a buffer circuit, however, the audio quality and audio device compatibility is greatly improved by first running the signal through a buffer circuit before it reaches the amplifier and/or effects units. A musician wishing to use the pickup system without an integrated buffer circuit can correct the impedance mismatch by connecting an independently dedicated buffer circuit in between the line out from the un-buffered pickup and the amplifier. Dedicated buffer circuits can often be purchased in the form of an effects pedal which is also commonly referred to as a 'stomp box'. An advantage to having an integrated buffer circuit embedded into the enclosure is that the musician does not have to use additional audio devices to correct the naturally occurring piezo pickup impedance mismatch.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE

Example 1

A thicker piezo disc is used for the drone sensor, which has a lower resonant frequency. A thinner smaller diameter piezo discs is used for the chanter pickup.

Drone Piezo Pickup:

The frequencies of the notes that the drone reeds produce are between 116 Hz and 233 Hz. Thus, a 41 mm piezo disc with a resonant frequency of 2.2 kHz produced an excellent sound for transducing these notes.

Frequency: 2.2 kHz (+/−.3 kHz)
Dimensions: 41 mm Disc (cut into 15 mm wide strip)
Material: Brass/Ceramic
Thickness: 0.63 mm
Lead Wires: 26 gauge
Lead Wire Overall Length: 9 to 12 inches
Space between sensor and reed: 2 mm The backside of the sensor (i.e., the side placed away from the reed) is coated with epoxy to protect the sensor.

Chanter Piezo Pickup:

The frequencies of the notes that the chanter reed produces are between 466 and 932 Hz. Thus, a 27 mm piezo disc with a resonant frequency of 4.6 kHz produced an excellent sound for transducing these notes.

Frequency: 4.6 kHz (+/−.5 kHz)
Dimensions: 27 mm Disc (cut into 15 mm wide strip)
Material: Brass/Ceramic
Thickness: 0.54 mm
Lead Wires: 26 gauge
Lead Wire Length from Chanter (Excluding Plug): 3 inches
Lead Wire Overall Length: ~5 inches
Space between sensor and reed: 2 mm The backside of the sensor (i.e., the side placed away from the reed) is coated with epoxy to protect the sensor.

The entire disclosures of all applications, patents and publications, cited herein and of U.S. Provisional Application Ser. No. 62/834,142 filed 18 Apr. 2019 2019 and U.S. Ser. No. 16/845,674 filed 10 Apr. 2020, is incorporated by reference herein.

The preceding example can be repeated with similar success by substituting the generically or specifically described components of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

I claim:

1. An electric bagpipe stock comprising
a sensor adhered or embedded within an indented groove in a stock inner wall, said indented groove having a hole extending between said inner wall of said stock and an outer wall of said stock
a wire extending from said sensor to a jack house mounted on the outer wall of said stock.

2. The electric bagpipe stock according to claim 1, wherein said stock is a chanter stock.

3. The electric bagpipe stock according to claim 2, wherein said indented groove on said chanter stock is located on the chanter insertion end of said stock.

4. The electric bagpipe stock according to claim 1, wherein said stock is a drone stock.

5. The electric bagpipe stock according to claim 4, wherein said indented groove on said drone stock is located about midway between the drone bag opening and the insertion end of said drone stock.

6. The electric bagpipe stock according to claim 1, wherein said indented groove is between 3-4 mm deep.

7. The electric bagpipe stock according to claim 1, wherein said indented groove is between 11-14 mm wide.

8. The bagpipe stock of claim 4, wherein the drone sensor is piezoelectric between 1.5 and 3 KHz.

9. The bagpipe stock of claim 2, wherein the chanter sensor is piezoelectric between 3 and 6 KHz.

10. An electric pickup device for a bagpipe drone or chanter stock, the electric pickup device comprising:
a sensor adhered within an indented groove in a drone or chanter stock inner wall, said indented groove having a hole extending between said inner wall of said stock and an outer wall of said stock
a wire extending from said sensor to a jack house mounted on the outer wall of said stock,
said wire for transmitting an audio signal from the drone or chanter sensor based on the vibrations of a reed to a cable encasing said wire to output the audio signal.

11. The electric pickup device of claim 10, wherein the drone sensor is piezoelectric between 1.5 and 3 KHz and between 0.55 and 0.7 mm thick.

12. The electric pickup device of claim 11, wherein the chanter sensor is piezoelectric between 3 and 6 KHz and between 0.42 and 0.58 mm thick.

13. A bagpipe comprising, an electric bagpipe stock comprising a sensor adhered or embedded within an indented groove in a stock inner wall, said indented groove having a hole extending between said inner wall of said stock and an outer wall of said stock
a wire extending from said sensor to a jack house mounted on the outer wall of said stock.

14. An electric pickup device for a bagpipe drone or chanter stock, the electric pickup device comprising:
a sensor adhered within an indented groove in a drone or chanter stock inner wall, said indented groove having a hole extending between said inner wall of said stock and an outer wall of said stock
a wire for transmitting an audio signal extends from said sensor to an integrated buffer circuit
within a jack house mounted on the outer wall of said stock,
said integrated buffer circuit is wired to an output jack.

15. The electric pickup device of claim 14, wherein said stock is a chanter stock.

16. The electric pickup device of claim 14, wherein said stock is a drone stock.

* * * * *